United States Patent [19]

Eichinger et al.

[11] Patent Number: 5,216,144
[45] Date of Patent: Jun. 1, 1993

[54] METHOD OF PRODUCING SHAPED CELLULOSIC ARTICLES

[75] Inventors: Dieter Eichinger, Vöcklabruck; Raimund Jurkovic, Lenzing; Stephan Astegger; Heinrich Firgo, both of Vöcklabruck; Peter Hinterholzer; Karin Weinzierl, both of Timelkam; Stefan Zikeli, Regau, all of Austria

[73] Assignee: Lenzing Aktiengesellschaft, Lenzing, Austria

[21] Appl. No.: 804,335

[22] Filed: Dec. 6, 1991

[30] Foreign Application Priority Data

Dec. 7, 1990 [AT] Austria ................................ 2482/90

[51] Int. Cl.[5] ......................... C08B 16/00; C08L 1/02; C09J 4/00; C09J 101/00
[52] U.S. Cl. ........................................ 536/56; 536/57; 106/168; 106/176; 106/203
[58] Field of Search .................... 536/56, 57; 106/168, 106/176, 203

[56] References Cited

U.S. PATENT DOCUMENTS

| | | | |
|---|---|---|---|
| 2,179,181 | 11/1939 | Graenacher et al. | 106/203 |
| 2,322,427 | 6/1943 | Edelstein | 536/56 |
| 3,447,939 | 6/1969 | Johnson | 106/135 |
| 3,758,458 | 9/1973 | Dyer | 106/165 |
| 4,246,221 | 1/1981 | McCorsley, III | 536/57 |
| 4,324,593 | 4/1982 | Varga | 106/203 |
| 4,634,470 | 1/1987 | Kamide et al. | 106/203 |

Primary Examiner—Nathan M. Nutter
Attorney, Agent, or Firm—Herbert Dubno; Jonathan Myers

[57] ABSTRACT

Shaped cellulosic bodies and especially cellulosic fibers or filaments are produced by precipitating cellulose from a solution containing cellulose and NMMO. To allow elevated concentrations of NMMO in the precipitating bath without detriment to the properties of the fibers or filaments produced, the temperature of the precipitating bath is held at most at 0° C.

6 Claims, 1 Drawing Sheet

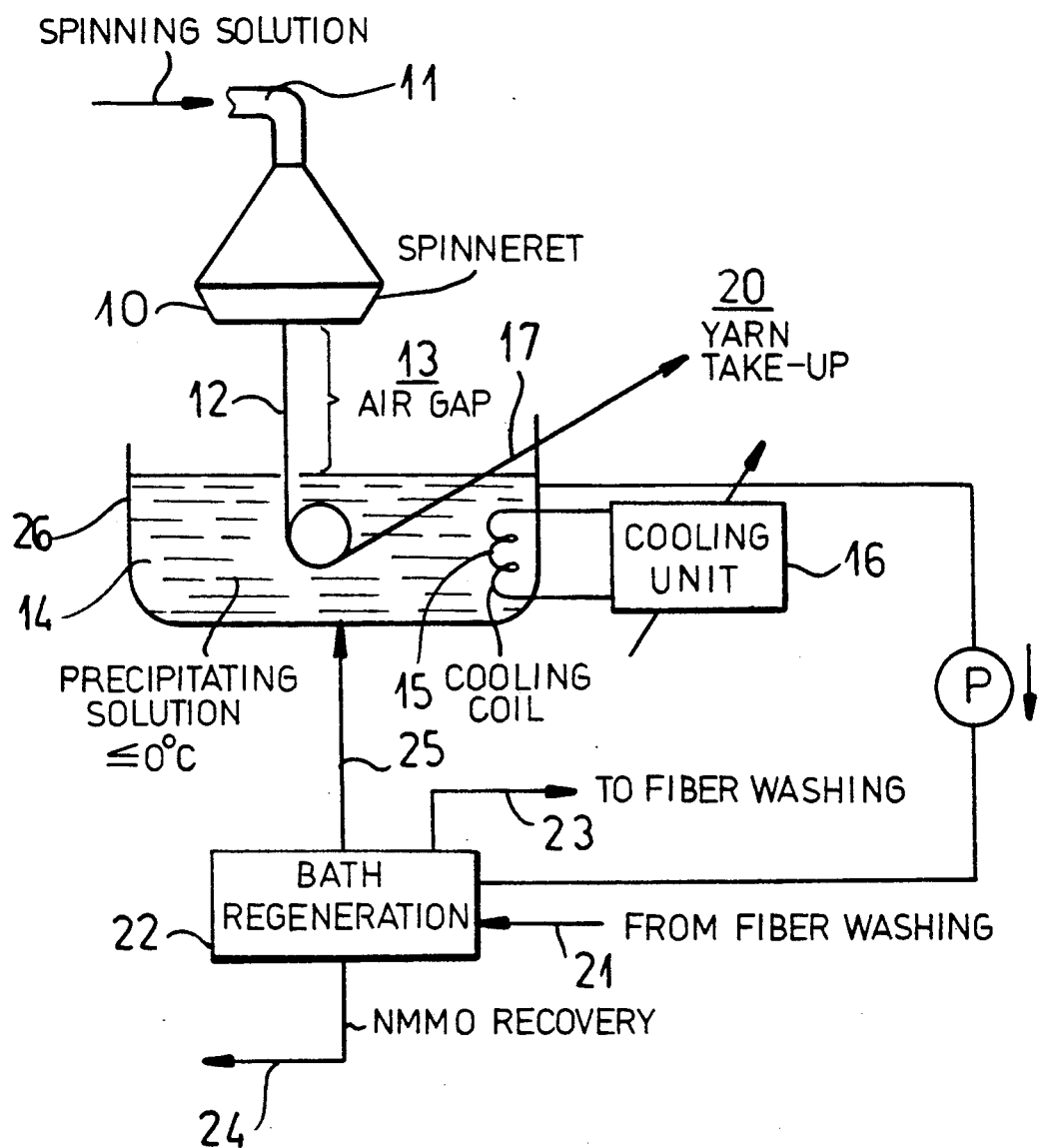

METHOD OF PRODUCING SHAPED CELLULOSIC ARTICLES

FIELD OF THE INVENTION

Our present invention relates to a process for producing shaped cellulose bodies from a solution of cellulose in N-methylmorpholine-N-oxide (NMMO) and water wherein the solution is shaped and the cellulose precipitated in a precipitating bath containing water and NMMO.

BACKGROUND OF THE INVENTION

U.S. Pat. No. 4,196,282 describes a process in which a solution of cellulose in N-methylmorpholine-N-oxide (hereinafter NMMO) and water is formed. Cellulose solutions of this type can be used to produce cellulose fibers or other shaped bodies of a cellulose base. For this purpose, the cellulose is extruded by spinning nozzles, e.g. a spinneret, into a precipitating or coagulating bath. The use of a mixture of NMMO and water as solvent has a number of advantages. For example, it allows operation with a closed solvent cycle since NMMO can be recovered and reused both in dissolving the cellulose for preparing the spinning solution and in the coagulating bath.

In the NMMO process, the cellulose dissolved in NMMO and water is coagulated in an NMMO containing coagulating bath, the fibers are then washed and the washing water recycled to the precipitating bath. In regenerating of the precipitating bath it is evaporated to allow recovery of the NMMO concentrate which can be used to form fresh solutions of the cellulose while the distillate can be employed for washing the fibers.

In prior art systems of this type, the NMMO concentration in the precipitating bath has been limited to about 20 to 25% since higher concentrations appeared to have a detrimental effect on the characteristics of the fibers. It is, of course, desirable to raise the concentration of the NMMO in the precipitating or coagulating bath so that smaller quantities of water need to be evaporated to regenerate this bath.

OBJECTS OF THE INVENTION

It is, therefore, the principal object of the present invention to provide an improved process for the production of shaped articles by the coagulation or precipitation of cellulose from an NMMO and water solution thereof, using an NMMO-containing precipitating or coagulating bath which will yield shaped bodies and especially fibers with good characteristics and yet can have an elevated NMMO concentration in the precipitating bath.

Another object of this invention is to provide an improved method of making shaped cellulosic articles whereby the aforementioned drawbacks are avoided.

SUMMARY OF THE INVENTION

These objects are attained, in accordance with the invention, in a process in which a solution of cellulose in NMMO and water is shaped and the shaped solution caused to pass into a precipitating and coagulating bath containing NMMO and water and in which the NMMO concentration is increased beyond that which has been considered to be possible heretofore without detriment to the quality of the shaped articles or fibers produced, by maintaining the temperature of the precipitating bath at 0° C. at the most.

We have found, quite surprisingly, that when the temperature is held at 0° C. at the most in the precipitating bath, the NMMO concentration thereof can be maintained above 40% without detriment to the fiber characteristics of the fibers produced.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating an apparatus for carrying out the method of the invention.

SPECIFIC DESCRIPTION

In the drawing, we have shown a spinneret 10 supplied with a spinning solution consisting of cellulose dissolved in NMMO and water via a line 11 and from which a plurality of solution streams 12 of which only one has been illustrated, can pass downwardly through an air gap 13 into the precipitating or coagulating bath 14 which consists of NMMO and water and preferably has an NMMO concentration well above 25% and preferably in the range of 28 to 45% and most preferably somewhat above 40% in NMMO by weight. The temperature of the precipitating solution is maintained at or below 0° C. by a cooling coil 15 immersed in the precipitating bath and connected to a refrigerating unit 16.

Brine or some other coolant chilled by the refrigerating unit 16 to a temperature below 0° C. can be circulated through the cooling coil, the fiber 17 produced in the precipitating bath is fed to a yarn take-up system 20 which can include a yarn or fiber washing station.

The washing liquid can be returned to an inlet 21 of the bath regenerating unit 22 from which a distillate can be fed at 23 to the fiber washing station while a retentate 24 having a high NMMO concentration can be supplied to the vessel in which the spinning solution is prepared. From the bath regenerating unit, a line 25 returns precipitating solution with a high NMMO concentration at a temperature below 0° C. to the vessel 26 for the bath 14.

The following examples compare the invention with the prior art and demonstrate the effect of the maintenance of a bath temperature below 0° C.

EXAMPLES 1-6

2276 g of cellulose (solids or dry content 94%, DP 750, DP=mean degree of polymerization, alpha=98%) and 0.02% by weight gallic acid propylester are suspended in 26139 g of 60% aqueous N-methylmorpholine-N-oxide solution.

Over a period of 2 hours at 100° C. and at a vacuum of 50 to 300 mbar, 9415 g of water is distilled off. The resulting spinning solution substantially had the following composition:

10% by weight cellulose, 12% by weight water, 78% by weight NMMO and the gallic acid propylester. This solution was forced through a spinneret with 589 holes (hole diameter 130 micrometers); the spinning temperature was 75° C. The resulting fibers, after stretching in an air gap, are coagulated in an NMMO-containing precipitating bath. The titer, the NMMO concentration in the precipitating bath and the temperature of the precipitating bath for the individual examples are given in the following table. From this table the fiber characteristics can be seen as well. In the table:

TABLE 1

| Example | Titer dtex | PRECIPITATING BATH NMMO Concentration % | Temperature °C. | FFk cN/tex | FDk % | SF cN/tex |
|---|---|---|---|---|---|---|
| 1 | 1.62 | 0 | 15 | 47.8 | 10.9 | 18.1 |
| 2 | 1.65 | 21 | 11 | 46.4 | 11.4 | 17.8 |
| 3 | 1.62 | 40 | 14 | 41.4 | 8.6 | 12 |
| 4 | 1.63 | 19.5 | 0 | 49 | 12.4 | 19.5 |
| 5 | 1.68 | 30 | −2.1 | 47.1 | 11.8 | 19.5 |
| 6 | 1.85 | 40 | −1.3 | 45.5 | 12.2 | 21.9 |

FFk Fiber tenacity (conditioned)
FDk Fiber elongation (conditioned)
SF Loop tenacity.

Examples 1 and 2 represent the state of the art. In Example 1 the precipitating bath consists of pure water while in Example 2 the bath consists of water with 20% NMMO. The precipitating bath temperatures are relatively high (15 or 11° C.). The cellulose fibers which are formed in these baths have satisfactory characteristics. In Example 3, an attempt is made to raise the NMMO concentration in the precipitating bath to 40% but the fiber characteristics ar significantly poorer.

Examples 4–6 represent the invention, i.e. a process using a precipitating bath with a temperature of 0° C. at the most. In these examples, an increase in the NMMO concentration in the precipitating bath has presently less effect on the fiber characteristics and in the case of Example 5, fiber characteristics are the same as those of Example 1 in spite of a substantially higher NMMO concentration in the precipitating bath.

We claim:

1. A process for producing a shaped cellulosic article which comprises the steps of:
   (a) forming a solution of cellulose in N-methylmorpholine-N-oxide and water;
   (b) shaping said solution;
   (c) passing the shaped solution through an air gap into a precipitating bath containing water and N-methylmorpholine-N-oxide to coagulate the cellulose and form said article; and
   (d) maintaining the temperature of said bath during the coagulation of cellulose to form said article therein at 0° C. at the most.

2. The method defined in claim 1 wherein the concentration of N-methylmorpholine-N-oxide in said precipitating bath is maintained above 28%.

3. The method defined in claim 1 wherein the concentration of N-methylmorpholine-N-oxide in said precipitating bath is maintained at about 30 to 40%.

4. The method defined in claim 3, further comprising the step of passing said shaped solution through an air gap before contacting it with said precipitating bath.

5. The method defined in claim 4, further comprising stretching said solution in said air gap.

6. The method defined in claim 5 wherein said solution is shaped by pressing it through an orifice in a spinneret to form a fiber.

* * * * *